May 11, 1965 TAKEHIKO SATO ETAL 3,182,457
SYSTEM FOR TRANSMITTING SIGNALS
Filed July 31, 1963

INVENTOR.
TAKEHIKO SATO &
TADASHI AKIYAMA
BY
Arthur H. Swanson

United States Patent Office 3,182,457
Patented May 11, 1965

3,182,457
SYSTEM FOR TRANSMITTING SIGNALS
Takehiko Sato, Tokyo, and Tadashi Akiyama, Yokohama, Japan, assignors to Honeywell Inc., a corporation of Delaware
Filed July 31, 1963, Ser. No. 298,983
3 Claims. (Cl. 60—54.5)

This invention relates to a system for transmitting signals by means of impulses and more particularly to a system for transmitting pressure signals by means of liquid pressure impulses generated in a tube filled with liquid, signals to be transmitted being applied at one end of said tube and at the other end of said tube liquid pressure impulses being generated.

Heretofore, a liquid surface gauge utilizing a float has been used for measuring the level of liquid in a tank. However in a system in which the displacement of a float on the surface of a liquid or the buoyancy acting on the float is proportionally converted into air pressure signals or electrical signals and is transferred in order to be read remotely, precise measurement could not be obtained due to the limit of accuracy. If, the ascent and descent of the float is delivered to a pulley by means of a wire or a tape and the rotation angle of the pulley is transferred electrically by means of, such as, a selsyn apparatus, a fairly precise measurement can be expected and this system is used in general.

However, even though the highest attention is paid, it is not absolutely safe to locate some electrical apparatus in the neighbourhood of a tank, in which an explosive material is stored, for example an oil reservoir or an oil tanker. Therefore, a new precise system for transferring the rotational angle in place of the conventional selsyn system has been requested.

In a precise system for measuring the displacement of a float, a system exists in which electrical contacts close with each unit variation of the float and the displacement of the float is converted into electrical impulse signals and is transferred, and by this system an accuracy as good or better than that of a selsyn system can be expected. This system is also conventional in the measuring technical field but this system is not used widely because of the simplicity of the selsyn system.

Therefore, one object of this invention is to provide a system for transmitting signals precisely of the surface of the liquid in a tank in which some explosive material is stored, such as an oil reservoir or an oil tank, for remote reading.

Another object of this invention is to provide a system for transmitting signals utilizing oil pressure impulses propagated in a tube filled with oil in place of electrical impulses.

Figure 1:
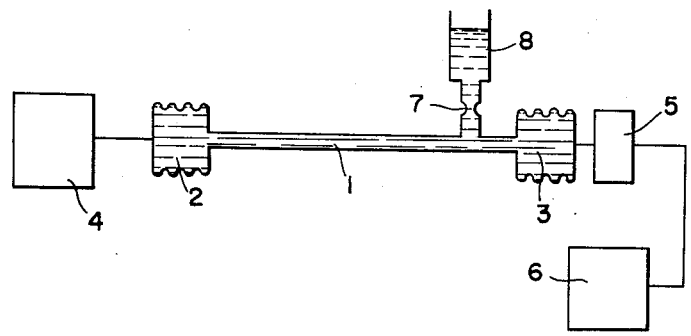
Figure 2:
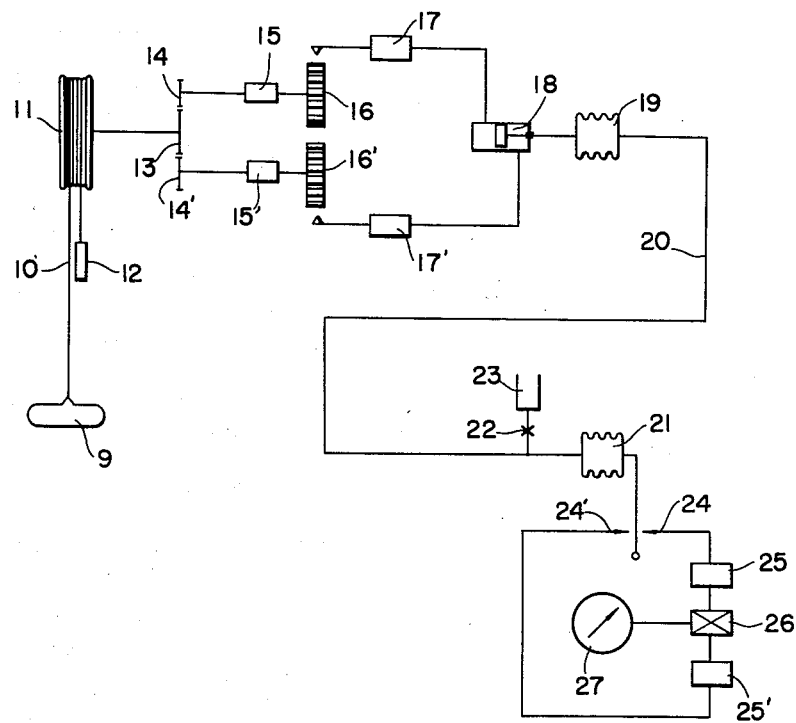

The objects and advantages of this invention will become readily apparent from the following detailed description taken in connection with the accompanying drawing, in which:

FIG. 1 is a skeleton diagram showing the principle of the operation of this invention, and FIG. 2 is also a skeleton diagram of an embodiment of this invention which is applied to a system of measuring a liquid level remotely.

In FIG. 1, metallic pipe 1, bellows 2 in the signal sending side and bellows 3 in the signal receiving side are connected air tightly and filled with oil. When hammer 4 for signal sending strikes bellows 2, oil pressure impulses generate and propagate in the oil in pipe 1 at a velocity nearly equal to the sonic velocity, that is 1000–1200 ft./sec. to bellows 3. Reference number 5 is a means, such as an electrical contact, which detects the oil pressure impulse received by bellows 3. Counter 6 operates by the action of means 5.

Throttle 7 connects oil vessel 8 to pipe 1 and the combination of throttle 7 and vessel 8 provides an escape means to prevent bellows 2 and 3 from displacement due to the expansion of the oil in pipe 1 caused by temperature variation. The size of throttle 7 is made so as to resist efficiently an oil pressure impulse but not to resist a slow change due to oil expansion so that the oil can escape to the oil vessel.

When hammer 4 is made to reciprocate a negative impulse can be transmitted in addition to a positive impulse and therefore it is easy to transmit two kinds of impulses by one pipe.

In FIG. 2, float 9 is connected to counter weight 12 by wire or tape 10 through pulley 11 and variations in the surface of the liquid are detected by the rotation of the pulley.

Gear 13 mounted on the axis of pulley 11 meshes with gears 14 and 14' and the rotations of gears 14 and 14' are transmitted to pulse convertors 16 and 16' via a ratchet means 15 or 15'. Ratchet means 15 and 15' provide a mechanism by which the rotation in one direction can be transmitted and the rotation in the other direction cannot be transmitted through slipping. The sense of transmission of rotation of ratchet means 15 is opposite to that of ratchet means 15' and ratchet means 15 and 15' transmit only the upward rotation and the downward rotation, respectively. Disks 16 and 16' have teeth on their periphery and the number of the teeth is designed to advance one pitch with each unit displacement of the float. Air pressure sending parts 17 and 17' incorporate nozzle flappers and each air pressure signal is transmitted to reciprocating cylinder 18 by one pitch movement of the teeth of disks 16 and 16'. Reciprocating cylinder 18 is energized rightwardly each pulse of ascent of the float and leftwardly each pulse of descent of the float. The impact force generated by the movement of the cylinder is transmitted to bellows 19 for sending the oil pressure impulse and reaches bellows 21 for sending the oil pressure impulse through the oil in pipe 20. A combination of throttle 22 and oil vessel 23 is also provided on pipe 20 and acts the same as the combination of throttle 7 and oil vessel 8.

Electrical contact 24 or 24' is made in accordance with the movement of bellows 21 and advances pulse motor 25 or 25' which utilizes an electromagnet and a ratchet means. Differential gear 26 transmits the difference between the rotations induced by the pulse of the float ascending or the pulse of the float descending to indicator 27.

Further, an electrical apparatus can be incorporated in this system for transmitting signals because an explosion-proof means is not necessary for the signal receiving part. Piping for the air pressure is necessary to operate the nozzle flapper and the reciprocating cylinder; however, the piping is omitted from the drawings for convenience.

The displacement of the float can be measured accurately from a remote point using no electrical energy for the detection part or the transmission part of the system for transmitting signals of the present invention. While some preferred embodiments of the present invention are disclosed in the figures, it is recognized that the scope of the present invention is not limited thereto and therefore it is not intended that the scope of the present invention be defined by the scope of the appended claims.

What is claimed is:
1. Signal transmitting apparatus, comprising
   a transmitting bellows having an outlet connection,
   a receiving bellows having an inlet connection,
   a liquid conduit interconnecting said inlet and outlet connections, both of said bellows and said conduit being hermetically filled with a substantially incompressible liquid so that an impact force given to one of said bellows produces a pressure impulse in said liquid which is propagated as a steep pressure change through said liquid to cause the rapid displacement of the other of said bellows, first conversion means for providing pulses representative of a value to be transmitted, force producing means interconnecting said conversion means and said transmitting bellows to apply thereto impact forces corresponding to said pulses, responsive means associated with said receiving bellows and responsive to said displacement thereof to provide an electrical impulse upon the occurrence of each such displacement, and second conversion means connected to said responsive means to receive said electrical impulses and to convert the latter into a manifestation representative of said value.

2. Apparatus as specified in claim 1, including a vessel containing liquid, means connecting said vessel to a portion of said apparatus to place said liquid in said vessel in liquid communication with the first mentioned liquid, and throttle means included in the last mentioned means to resist said pressure impulses.

3. Apparatus as specified in claim 1, wherein said first conversion means includes means operative to provide first pulses representative of changes in one direction in said value and to provide second pulses representative of changes in the opposite direction in said value, wherein said force producing means includes means to apply to said transmitting bellows positive impact forces corresponding to said first pulses and negative impact forces corresponding to said second pulses, wherein said responsive means includes means to provide an electrical impulse of one type upon the displacement of said receiving bellows corresponding to one of said positive impact forces, and to provide an electrical impulse of a different type upon the displacement of said receiving bellows corresponding to one of said negative impact forces, and wherein said second conversion means includes means to cause said manifestation to change in one direction upon receipt of said electrical impulses of said one type, and to cause said manifestation to change in the opposite direction upon receipt of said electrical impulses of said different type.

References Cited by the Examiner

UNITED STATES PATENTS

| 1,623,049 | 4/27 | Dorsey | 60—54.5 X |
| 2,399,505 | 4/46 | Phillips | 60—54.5 |
| 2,637,167 | 5/53 | Barradell-Smith et al. | 60—54.5 |
| 2,637,168 | 5/53 | Davison et al. | 60—54.5 |
| 2,800,034 | 7/57 | Seeger | 60—54.5 X |

FOREIGN PATENTS

| 1,133,487 | 11/56 | France. |
| 1,229,853 | 3/60 | France. |

JULIUS E. WEST, *Primary Examiner.*

ROBERT R. BUNEVICH, *Examiner.*